United States Patent Office 3,110,844
Patented Nov. 12, 1963

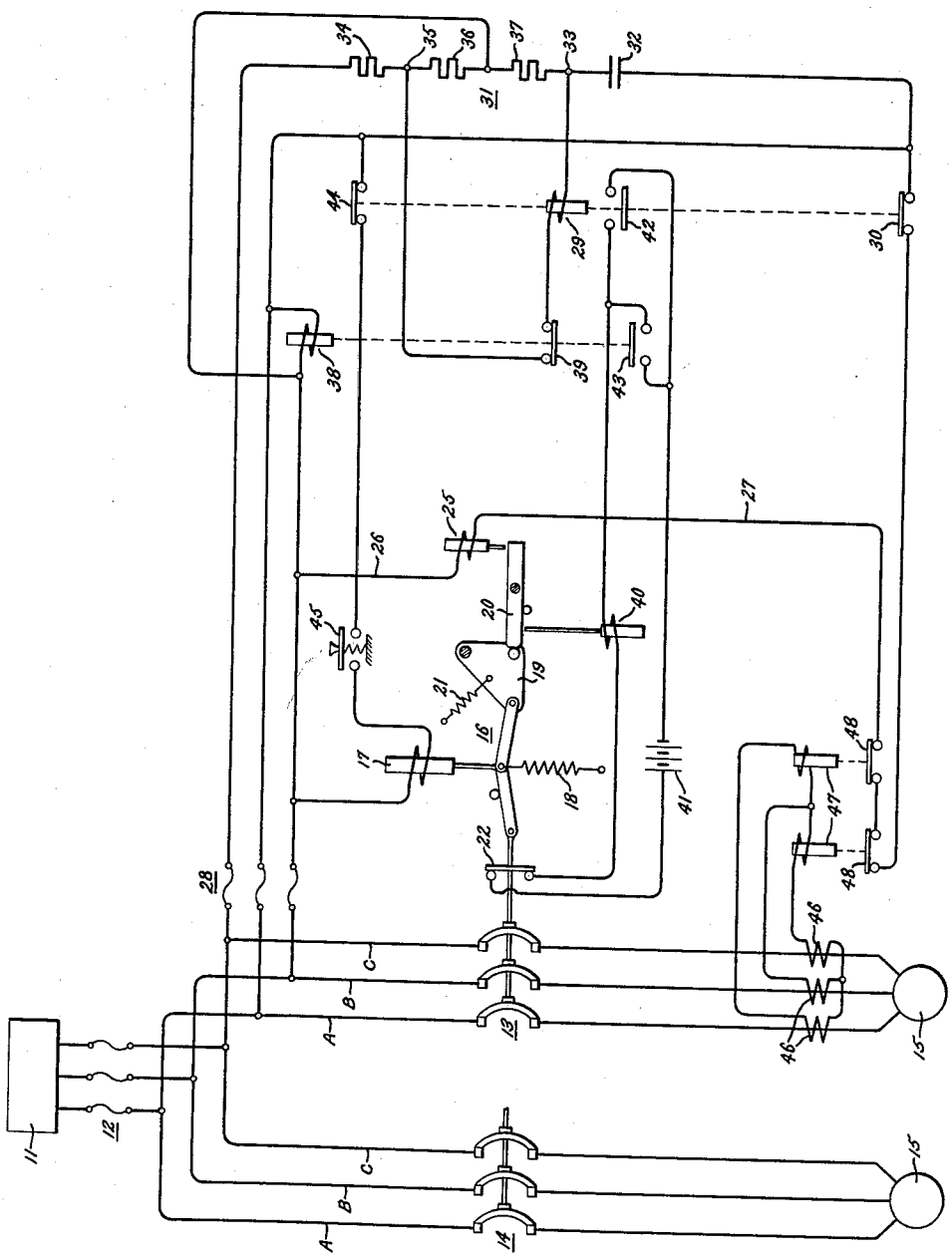

3,110,844
OPEN AND REVERSE PHASE PROTECTIVE SYSTEM FOR POLYPHASE ELECTRIC APPARATUS
Thomas F. Brandt, Jr., Media, Pa., assignor to General Electric Company, a corporation of New York
Filed Sept. 29, 1959, Ser. No. 843,304
9 Claims. (Cl. 317—47)

This invention relates to protective systems for polyphase A.-C. electric apparatus, and more particularly it relates to an improved system for protecting such apparatus from the possibilities of single phasing or a reverse phase condition.

When polyphase load apparatus, such as an electric motor driving an irrigation pump, for example, is energized by single-phase electric power or by polyphase power having the wrong phase rotation, serious damage is likely to result. The motor will operate under the first of these abnormal conditions with undesirably reduced output torque, while incorrect phase rotation will cause the connected machinery to be driven backwards with damaging consequences. It is desirable, therefore, to provide suitable means for preventing energization of the electric apparatus in the first instance if either of these abnormal conditons should exist and for disconnecting the apparatus from its source of electric power in the event that such a condition occurs while the apparatus is energized.

One known technique for the detection of reverse phase and open phase conditions utilizes a negative-phase-sequence voltage filter. Such a filter will produce a resultant output voltage whenever the normal balance of a polyphase electric power circuit is disturbed, as when either open or reverse phase conditions exist. However, the amount of the resultant voltage produced when an open phase occurs will vary depending on the particular phase which is deenergized, and to adopt this technique alone for the present purposes would require the use of relatively sensitive and delicate voltage responsive means in conjunction with the filter.

A general object of this invention, therefore, is the provision of an improved protective system using relatively insensitive, rugged and inexpensive components arranged for consistent and reliable operation in response to all possible variations of open and reverse phase conditions in a polyphase circuit supplying A.-C. electric power to load apparatus.

A further object of the invention is to provide a reliable and relatively inexpensive open and reverse phase protective system utilizing a negative-phase-sequence voltage filter in conjunction with rugged, long-life components designed for general purpose application under adverse environmental conditions.

In carrying out the invention in one form, I provide an electric circuit interrupter equipped with an undervoltage device for interrupting electric power being supplied from a 3-wire electric power line to load apparatus whenever the undervoltage device is deenergized. I connect the undervoltage device for energization by line voltage taken from across first and second wires of the electric power line. A negative-phase-sequence voltage filter is connected to the line for deriving therefrom a resultant voltage dependent upon the negative-phase-sequence components of the line voltages, and a normally inactive circuit controlling means is associated with this filter for activation by the resultant voltage in response to a reversal of the normal phase rotation of the line voltages and also in response to deenergization of the third wire of the line. The circuit controlling means is connected in circuit with the undervoltage device to cause its deenergization when activated, whereby an interruption in the supply of electric power to the load apparatus is effected upon the occurrence of a reverse phase or any open phase condition.

In another aspect of my invention, the circuit interrupter is equipped with a shunt or potential trip device in lieu of the undervoltage device. The circuit controlling means associated with the negative-phase-sequence voltage filter is arranged when activated to connect the shunt trip device for energization from a source of electric energy, thereby effecting an interruption in the supply of electric power to the load apparatus. In this aspect of the invention I provide voltage responsive means connected across the first and second wires of the electric power line for energization by the corresponding line voltage, and the voltage responsive means is also arranged, whenever deenergized, to connect the shunt trip device to the source of electric energy. Thus the voltage responsive means is utilized to initiate a power interruption in response to deenergization of either the first or second wire of the power line.

In still another aspect of the invention, I dispose the above-mentioned voltage responsive means in supervisory relationship with the circuit controlling means of the protective system to prevent activation of the latter means whenever the former means is deenergized. This is done to ensure complete inactivation of the circuit controlling means whenever the first or second wire of the power line is deenergized, since activation of the circuit controlling means under such conditions might otherwise be unsuccessfully attempted with detrimental effects to the wear and life of this component of my system.

My invention will be better understood and its various objects and advantages will be more fully appreciated from the following description taken in conjunction with the accompanying drawing the single FIGURE of which is a schematic circuit diagram illustrating the various aspects of the invention.

In the drawing I have shown schematically by way of illustration a low-voltage alternating-current electric power circuit comprising a source of 3-phase electric power represented by the block 11, a set of three current limiting fuses 12 in the respective phases, a pair of parallel 3-wire (A, B and C) electric power lines branching from the fuses 12, and a pair of electric circuit interrupters 13 and 14 respectively connected in the 3-wire lines. Each of the circuit interrupters is connected between its respective line and polyphase A.-C. load apparatus such as the schematically illustrated motor 15. Each of the motors 15 is used to drive appropriate machinery such as irrigation pumps, not shown.

Any suitable circuit breaker or switch may be used to perform the circuit interrupting function of the interrupters 13 and 14. The interrupters are identical in construction, and for the purposes of the present disclosure I have chosen to illustrate schematically the construction of the circuit interrupter 13 only. This interrupter as shown comprises an operating mechanism 16 of the toggle type. Closing means comprising a solenoid 17 coupled to the mechanism 16 is employed to move the mechanism to its closed circuit position against the force of a strong opening spring 18. The mechanism is held in its closed position, as shown, by means of a latch member 19 in cooperation with a trip member 20.

By tilting the trip member 20 in a clockwise direction from the horizontal position shown in the drawing, the operating mechanism 16 is unlatched and moves under the influence of spring 18 to an open circuit position wherein the switch contacts of the interrupter 13 are separated, thereby interrupting the supply of electric power from the associated line A, B, C, to the load apparatus 15. A tension spring 21 connected to the latch member 19 resets this member after such an opening operation. A normally open position indicating auxiliary contact 22 is associated with the circuit interrupter 13 as shown.

In order to actuate the trip member 20 of the illustrated circuit interrupter 13, the interrupter is equipped with an undervoltage device 25. Whenever this device is deenergized, it causes the trip member 20 to tilt clockwise thereby effecting a circuit interrupting operation of the interrupter 13. The undervoltage device 25 is connected by circuit means including conductors 26 and 27 for energization by line voltage taken from across wires A and B of the electric power line. Control power fuses 28 are provided in the circuit means between the undervoltage device 25 and wires A and B, and it should be understood that this connection could be made through a potential transformer if desired.

The undervoltage device 25 provides protection for the load apparatus 15 from the possibility of single phasing due to the opening or deenergization of either wire A or B of the electric power line. Such deenergization might occur, for example, if only one of the set of current limiting fuses 12 were blown due to a fault in the parallel-connected load apparatus being supplied through circuit interrupter 14.

In order to effect an interruption in the supply of electric power to the load apparatus 15 upon deenergization of wire C of the electric power line, or upon a reversal of the normal phase rotation of the line voltages, my protective system includes circuit controlling means 29 having a set of normally closed circuit controlling contacts 30 serially connected in the energizing circuit for the undervoltage device 25. The circuit controlling means 29 is an electromagnetic relay connected for energization by resultant voltage produced by a negative-phase-sequence voltage filter 31.

Although other suitable negative-phase-sequence voltage filters could be used, I prefer at present to use the illustrated filter comprising a capacitor 32 connected between wire A of the power line and a point 33, a resistor 34 connected between wire C and a point 35, and a pair of resistors 36 and 37 connected in series between the points 33 and 35, with the common terminals of the latter two resistors being connected to wire B. The magnitudes of resistance of the resistors 34, 36 and 37 are preferably selected to be equal to each other and to be equal to $\sqrt{3}X_c$, ($X_c$ being the magnitude of the capacitive reactance of capacitor 32). With this arrangement, as will be readily understood by those skilled in the art, there will be no resultant voltage produced between points 33 and 35 of the filter under balanced conditions in the electric power line, and hence the relay 29, which is connected between points 33 and 35, is normally inactive.

In the illustrated embodiment of my invention, normal balanced conditions exist in the electric power circuit when the phase rotation of the line voltages is A–B–C. Should this phase rotation be reversed to a sequence C–B–A, negative-phase-sequence components of the line voltages will be present and filter 31 produces between points 33 and 35 a resultant voltage dependent upon these components. This resultant voltage in the illustrated protective system will have a magnitude equal to 87% of line voltage. As a result, the circuit controlling relay 29 is activated, contacts 30 open, and the undervoltage device 25 associated with the circuit interrupter 13 is deenergized.

A resultant voltage is also produced between points 33 and 35 of the filter 31 whenever wire C of the electric power line is deenergized. The amount of the resultant voltage produced under this circumstance is ample for activating the circuit controlling relay 29. However, should wire B be the one which is deenergized, a resultant voltage of significantly less magnitude will be produced by the filter 31 and there will be insufficient energization available for positively activating the circuit controlling relay 29 unless a very sensitive and relatively delicate relay were used. I prefer not to use a relay of this nature, since such a relay is relatively expensive and is not adequately durable and reliable when exposed to adverse environmental conditions such as a dusty atmosphere. But with the arrangement shown in the drawing, wherein the undervoltage device 25 is connected across wires A and B of the electric power lines to respond directly to deenergization of either wire, the circuit controlling relay 29 is not called upon to indicate these particular abnormal conditions.

I have found that although the circuit controlling relay 29 is not definitively activated in response to an opening or deenergization of wire B of the power line, enough power is supplied to the winding of this relay to cause it to vibrate or "chatter" under this particular condition. Such vibration is undesirable in that it increases the wear and reduces the life of the relay. Therefore, I have provided voltage responsive relay means 38 having a set of normally open circuit controlling contacts 39 disposed in supervisory relationship with the circuit controlling relay 29. The voltage responsive relay 38 is connected for energization in accordance with the line voltage taken from across wires A and B, and whenever this relay is deenergized, as in response to the deenergization of wire B, its contacts 39 open thereby preventing activation of the supervised relay 29.

From the foregoing detailed description of the components and circuitry of a preferred form of my protective system, its mode of operation may now be readily followed. Upon the reversal of the normal phase rotation of the voltages in the 3-wire line supplying electric power to the load apparatus 15 through circuit interrupter 13, the negative-phase-sequence voltage filter 31 produces a resultant voltage between points 33 and 35 which activates the circuit controlling relay 29. The contacts 30 of this relay respond to activation thereof by opening the circuit means connecting the undervoltage device 25 of the circuit interrupter 13 to its source of energization. The deenergized undervoltage device effects an interruption in the supply of electric power to the apparatus 15. In the event that the phase reversal should exist while the circuit interrupter is open, the deenergized undervoltage device effectively prevents closure of the interrupter.

The same sequence of events occurs upon deenergization of wire C of the electric power line. Under this abnormal condition, the negative-phase-sequence voltage filter produces between points 33 and 35 a resultant voltage of sufficient magnitude to activate the circuit controlling relay 29.

Should either wire A or B of the electric power line be deenergized, the undervoltage device 25 connected across these wires is necessarily deenergized, while activation of the circuit controlling means 29 is prevented by the simultaneous deenergization of the voltage responsive relay 38 which opens its contacts 39 to disconnect the relay 29 from the filter 31. Thus, the protective system responds effectively to all possible variations of open phase conditions.

My protective system is also adaptable for use in conjunction with a circuit interrupter equipped with a shunt trip device in place of the undervoltage device 25. Such a shunt trip device, which is sometimes known as a potential trip, is illustrated at 40 in the drawing. When energized from a source of electric energy, such as from the illustrated battery 41, the device 40 tilts trip member 20 in a clockwise direction, whereby the operating mechanism 16 of the circuit interrupter 13 is unlatched and an interruption in the supply of electric power to the load apparatus 15 is effected.

In this embodiment of the invention, the shunt trip device 40 is connected for energization to the battery 41 by a circuit including the position indicating auxiliary contact 22 of the circuit interrupter 13 and a set of normally open circuit controlling contacts 42 of the circuit controlling relay 29. The voltage responsive relay 38 is provided with a set of normally closed circuit controlling contacts 43 connected in parallel relationship with the contacts 42. Thus, whenever the voltage responsive relay 38 is deenergized or the circuit controlling relay 29 is activated, the shunt trip device 40 and the battery 41 are interconnected thereby energizing the device 40 and consequently opening the interrupter 13. The voltage responsive relay 38, being connected for energization across wires A and B of the electric power line, provides the desired open phase protection in response to deenergization of either of these two wires.

If a dependable source of electric energy such as the battery 41 is not available for energizing the shunt trip device 40, this device can be connected to derive its energization directly from wires A and B of the electric power line. In this application of my invention, the circuit interrupter 13 would be equipped with both the undervoltage device 25 and the shunt trip device 40 as shown, the undervoltage device being necessary to ensure a circuit interrupting operation in the event that either wire A or B were deenergized. In this case both circuit controlling contacts 30 and 42 of the circuit controlling relay 29 would be used. The undervoltage device 25 also serves to prevent closure of the circuit interrupter 13 should any wire A, B or C be deenergized or should the normal phase rotation of the line voltages be reversed.

Another way for preventing closure of the circuit interrupter 13 should abnormal conditions exist in the electric power line is made possible by providing the circuit controlling relay 29 with another set of normally closed contacts 44. As shown in the drawing, contacts 44, in series with a manual closing switch 45, are connected in the energizing circuit of the closing solenoid 17 of the circuit interrupter. It will be seen that whenever relay 29 is activated its contacts 44 open, the closing circuit is immobilized, and the closing solenoid 17 cannot be energized.

In order to provide overcurrent protection for the load apparatus 15, the illustrated system includes a set of schematically represented current transformers 46 appropriately connected to a pair of overcurrent responsive electromagnetic relays 47. Each relay 47 has a normally closed contact 48, and the two contacts 48 are serially connected in the energizing circuit for the undervoltage device 25. Whenever predetermined overcurrent conditions exist in the load apparatus 15, one or the other of the overcurrent responsive relays 47 is sufficiently energized to open its contact 48 thereby deenergizing the undervoltage device and effecting an interruption in the supply of electric power to the apparatus. Other equivalent arrangements could be used, such as, for example, a plurality of conventional bimetallic elements designed to open the undervoltage circuit when heated excessively.

While I have shown and described several forms of my invention by way of illustration, other modifications will occur to those skilled in the art. I contemplate, therefore, by the concluding claims to cover all such modifications as fall within the true spirit and scope of my invention.

What I claim as new and desire to secure by Letters Patent of the United States is:

1. A protective system for alternating-current load apparatus energized by polyphase electric power from a 3-wire electric power line, comprising: an electric circuit interrupter adapted to be connected between the load apparatus and said line, the circuit interrupter being equipped with an undervoltage device for effecting, when deenergized, an interruption in the supply of electric power to said apparatus; circuit means for connecting the undervoltage device for energization by line voltage taken from across first and second wires of said line; a negative-phase-sequence voltage filter adapted to be connected to said line for deriving therefrom a resultant voltage dependent upon the negative-phase-sequence components of the line voltages; and normally inactive circuit controlling means connected to said filter for activation by said resultant voltage in response to a reversal of the normal phase rotation of the line voltages and also in response to deenergization of the third wire of said line, said circuit controlling means being connected in said circuit means and being arranged when activated to cause deenergization of the undervoltage device.

2. A protective system for alternating-current load apparatus energized by polyphase electric power from a 3-wire electric power line, comprising: an electric circuit interrupter adapted to be connected between the load apparatus and said line, the circuit interrupter being equipped with a shunt trip device for effecting, when energized, an interruption in the supply of electric power to said apparatus; closing means for the circuit interrupter; a closing circuit for electrically energizing said closing means thereby to effect closure of the interrupter; voltage responsive means adapted to be connected across first and second wires of said line for energization by the corresponding line voltage; a tripping circuit including said voltage responsive means for connecting the shunt trip device for energization from a source of electric energy whenever the voltage responsive means is deenergized; a negative-phase-sequence voltage filter adapted to be connected to said line for deriving therefrom a resultant voltage dependent upon the negative-phase-sequence components of the line voltages; and normally inactive circuit controlling means connected to said filter for activation by said resultant voltage in response to a reversal of the normal phase rotation of the line voltages and also in response to deenergization of the third wire of said line, said circuit controlling means being connected to said tripping circuit for interconnecting, when activated, the shunt trip device and said source of electric energy thereby energizing said device, said circuit controlling means also being arranged when activated to immobilize said closing circuit thereby preventing energization of said closing means.

3. A protective system for alternating-current load apparatus energized by polyphase electric power from a 3-wire electric power line, comprising: an electric circuit interrupter adapted to be connected between the load apparatus and said line, the circuit interrupter being equipped with an undervoltage device for effecting, when deenergized, an interruption in the supply of electric power to said apparatus and being further equipped with a shunt trip device for effecting, when energized, a similar interruption; a negative-phase-sequence voltage filter adapted to be connected to said line for deriving therefrom a resultant voltage dependent upon the negative-phase-sequence components of the line voltages; a normally inactive electromagnetic relay connected to said filter for activation by said resultant voltage in response to a reversal of the normal phase rotation of the line voltages and also in response to deenergization of a first wire of said line, said relay having two separate sets of circuit controlling contacts; first circuit means including one set of the circuit controlling contacts of said relay for connecting the undervoltage device for energization by line voltage taken from across second and third wires of said 3-wire electric power line, said one set of contacts being opened upon activation of said relay thereby to deenergize the undervoltage device; and second circuit means including the other set of circuit controlling contacts of said relay for connecting the shunt trip device for energization by the line voltage taken from across said second and third wires, said other set of contacts being closed upon activation of said relay thereby to energize the shunt trip device.

4. A protective system for controlling the operation of a circuit interrupter connected in a 3-wire electric power line supplying polyphase electric power to alternating-current load apparatus, the circuit interrupter being equipped with an undervoltage device effective when deenergized to open the interrupter and with a shunt trip device effective when energized to open the interrupter, comprising: a negative-phase-sequence voltage filter adapted to be connected to the electric power line for deriving therefrom a resultant voltage dependent upon the negative-phase-sequence components of the line voltages; a normally inactive electromagnetic relay connected to the filter for activation by said resultant voltage in response to a reversal of the normal phase rotation of the line voltages and also in response to deenergization of a first wire of said line, said relay having two separate sets of circuit controlling contacts; first circuit means including one of the sets of circuit controlling contacts of said relay for connecting the undervoltage device of the circuit interrupter for energization by line voltage taken from across second and third wires of the 3-wire line, said one set of contacts being opened upon activation of said relay thereby to deenergize the undervoltage device; voltage responsive means adapted to be connected across said second and third wires for energization by the corresponding line voltage; and second circuit means, including said voltage responsive means in cooperation with the other set of circuit controlling contacts of said relay, for connecting the shunt trip device of the circuit interrupter for energization from a source of electric energy upon deenergization of the voltage responsive means or activation of said relay.

5. A protective system for alternating-current load apparatus energized by polyphase electric power from a 3-wire electric power line, comprising: an electric circuit interrupter adapted to be connected between the load apparatus and said line, the circuit interrupter being equipped with an undervoltage device for effecting, when deenergized, an interruption in the supply of electric power to said apparatus; circuit means for connecting the undervoltage device for energization by line voltage taken from across first and second wires of said line; a negative-phase-sequence voltage filter adapted to be connected to said line for deriving therefrom a resultant voltage dependent upon the negative-phase-sequence components of the line voltages; normally inactive circuit controlling means connected to said filter for activation by said resultant voltage in response to a reversal of the normal phase rotation of the line voltages and also in response to deenergization of the third wire of said line, said circuit controlling means being connected in said circuit means and being arranged when activated to open the circuit means thereby deenergizing the undervoltage device; and overcurrent responsive means coupled to said line and connected in said circuit means for opening the circuit means and thereby deenergizing the undervoltage device in response to predetermined overload conditions in said apparatus.

6. A protective system for alternating-current load apparatus energized by polyphase electric power from a 3-wire electric power line, comprising: an electric circuit interrupter adapted to be connected between the load apparatus and said line, the circuit interrupter being equipped with an undervoltage device for effecting when deenergized, an interruption in the supply of electric power to said apparatus; circuit means for connecting the undervoltage device for energization by line voltage taken from across first and second wires of said line; a negative-phase-sequence voltage filter adapted to be connected to said line for deriving therefrom a resultant voltage dependent upon the negative-phase-sequence components of the line voltages; normally inactive circuit controlling means connected to said filter for activation by said resultant voltage in response to a reversal of the normal phase rotation of the line voltages and also in response to deenergization of the third wire of said line, said circuit controlling means being connected in said circuit means and being arranged when activated to cause deenergization of the undervoltage device; and voltage responsive means adapted to be energized in accordance with the line voltage taken from across said first and second wires and disposed in supervisory relationship with said circuit controlling means to prevent activation thereof when deenergized.

7. A protective system for alternating-current load apparatus energized by polyphase electric power from a 3-wire electric power line, comprising: an electric circuit interrupter adapted to be connected between the load apparatus and said line, the circuit interrupter being equipped with a shunt trip device for effecting, when energized, an interruption in the supply of electric power to said apparatus; a voltage responsive relay adapted to be energized in accordance with line voltage taken from across first and second wires of said line, said relay having two separate sets of circuit controlling contacts; circuit means including one of the sets of circuit controlling contacts of said relay for connecting the shunt trip device for energization from a source of electric energy whenever the relay is deenergized; normally inactive circuit controlling means connected in said circuit means and arranged when activated to cause energization of the shunt trip device; a negative-phase-sequence voltage filter adapted to be connected to said line for deriving therefrom a resultant voltage dependent upon the negative-phase-sequence components of the line voltages; and additional circuit means, including the other set of circuit controlling contacts of said relay, connecting said circuit controlling means to said filter for activation by said resultant voltage in response to a reversal of the normal phase rotation of the line voltages and also in response to deenergization of the third wire of said line, said other set of contacts being disposed to prevent activation of said circuit controlling means whenever said relay is deenergized.

8. A protective system for alternating-current load apparatus energized by polyphase electric power from a 3-wire electric power line, comprising: an electric circuit interrupter adapted to be connected between the load apparatus and said line, the circuit interrupter being equipped with an undervoltage device for effecting, when deenergized, an interruption in the supply of electric power to said apparatus and being further equipped with a shunt trip device for effecting, when energized, a similar interruption; a negative-phase-sequence voltage filter adapted to be connected to said line for deriving therefrom a resultant voltage dependent upon the negative-phase-sequence components of the line voltages; a normally inactive electromagnetic relay connected to said filter for activation by said resultant voltage in response to a reversal of the normal phase rotation of the line voltages and also in response to deenergization of a first wire of said line, said relay having two separate sets of circuit controlling contacts; voltage responsive means adapted to be connected for energization by line voltage taken from across second and third wires of said 3-wire line and disposed in supervisory relationship with said relay for preventing, when deenergized, activation thereof; first circuit means including one of the sets of circuit controlling contacts of said relay for connecting the undervoltage device for energization by the line voltage taken from across said second and third wires, said one set of contacts being arranged to cause deenergization of the undervoltage device upon activation of said relay; and second circuit means including the other set of circuit controlling contacts of said relay for connecting the shunt trip device for energization by line voltage taken from across said second and third wires, said other set of contacts being arranged to cause energization of the shunt trip device upon activation of said relay.

9. A protective system for alternating-current load apparatus energized by polyphase electric power from a 3-wire electric power line, comprising: an electric circuit interrupter adapted to be connected between the load apparatus and said line, the circuit interrupter being equipped with an undervoltage device for effecting when deenergized, an interruption in the supply of electric power to said apparatus; circuit means for connecting the undervoltage device for energization by line voltage taken from across first and second wires of said line; a negative-phasesequence voltage filter adapted to be connected to said line for deriving therefrom a resultant voltage dependent upon the negative-phase-sequence components of the line voltages; normally inactive circuit controlling means connected to said filter for activation by said resultant voltage in response to a reversal of the normal phase rotation of the line voltages and also in response to deenergization of the third wire of said line, said circuit controlling means being connected in said circuit means for opening, when activated, the circuit means thereby to deenergize the undervoltage device; voltage responsive means adapted to be energized in accordance with the line voltage taken from across said first and second wires and disposed in supervisory relationship with said circuit controlling means for preventing, when deenergized, actuation thereof; and overcurrent responsive means coupled to the said line and connected in said circuit means to cause deenergization of the undervoltage device in response to predetermined overload conditions in said apparatus.

References Cited in the file of this patent

UNITED STATES PATENTS

| | | |
|---|---|---|
| 1,381,302 | Harvey | June 14, 1921 |
| 1,809,827 | Bower | June 16, 1931 |
| 1,826,099 | Stevens | Oct. 6, 1931 |
| 2,162,516 | Parsons | June 13, 1939 |
| 2,315,470 | Warrington | Mar. 30, 1943 |